UNITED STATES PATENT OFFICE.

MICHAEL NOLL, OF NEW YORK, N. Y.

IMPROVED EYE-WATER.

Specification forming part of Letters Patent No. 55,889, dated June 26, 1866.

*To all whom it may concern:*

Be it known that I, MICHAEL NOLL, of New York, in the county and State of New York, have invented a new and useful Eye-Water; and I do hereby declare that the following is a full and exact description of the same.

This eye-water consists of sulphate of zinc and the white of an egg dissolved in distilled water. To prepare the same I take an egg and boil the same hard, and when cold I peel the skin off and remove the yellow part or yelk of the egg. I then put into the cavity of the white of the egg two (2) drams of sulphate of zinc, and then fasten this white of the egg together again with a string. This white of the egg with the sulphate of zinc inclosed is then put into a bottle containing one pint of distilled water and left quietly standing for at least forty-eight hours, during which time the sulphate of zinc and part of the white of the egg will have been dissolved, when the eye-water will be ready for use.

This eye-water will cure all diseases and inflammation of the eye, and it will also remove all foreign substances, such as mortar, iron-dust, &c., in a very short time, leaving the eye-sight as strong and clear as ever.

What I claim as my invention, and desire to secure by Letters Patent, is—

The herein-described eye-water, composed of sulphate of zinc and the white of an egg dissolved in distilled water, substantially as set forth.

MICHAEL NOLL.

Witnesses:
HENRY E. ROEDER,
DAVID MOSHER.